No. 836,777. PATENTED NOV. 27, 1906.
E. T. PARSONS & V. PENNINGTON, Jr.
DOUGH DIVIDING MACHINE.
APPLICATION FILED FEB. 17, 1905.

Witnesses:
F. E. Anderson
Frances P. Blodgett

Inventors:
E. T. Parsons  V. Pennington Jr.
By their Attorney

No. 836,777. PATENTED NOV. 27, 1906.
E. T. PARSONS & V. PENNINGTON, Jr.
DOUGH DIVIDING MACHINE.
APPLICATION FILED FEB. 17, 1905.

Witnesses:
H. E. Anderson.
Frances E. Blodgett.

Inventors:
E. T. Parsons. V. Pennington Jr.
By their Attorney,

UNITED STATES PATENT OFFICE.

EDWARD T. PARSONS, OF BELLEVILLE, AND VIRGIL PENNINGTON, JR., OF NEWARK, NEW JERSEY, ASSIGNORS TO C. A. THOMSON MACHINE COMPANY, OF BELLEVILLE, NEW JERSEY, A CORPORATION OF NEW JERSEY.

DOUGH-DIVIDING MACHINE.

No. 836,777.     Specification of Letters Patent.     Patented Nov. 27, 1906.

Application filed February 17, 1905. Serial No. 246,033.

*To all whom it may concern:*

Be it known that we, EDWARD T. PARSONS, a citizen of the United States, residing at Belleville, and VIRGIL PENNINGTON, Jr., a citizen of Canada, residing at Newark, in the county of Essex and State of New Jersey, have invented certain new and useful Improvements in Dough-Dividing Machines, of which the following is a specification.

Our invention relates to machines for dividing dough into batches preparatory to the molding operation.

In the prior art the usual practice is to place the dough in a hopper and to force it under pressure from said hopper by a piston or otherwise through stationary tubes, the dough being divided from the mass in the tubes as it leaves the ends of the latter. Owing to the great pressure to which the dough is subjected in the old mode of procedure, the particles are so compacted that they adhere, and consequently do not expand when the batch is severed from the mass in the tube. This leaves the dough of the batch severed from the rod in the stationary tube so hard or dense that when it is subjected to the molding operation and further condensed the loaves are not in the light and springy condition necessary for the oven and, if baked, are too hard for use.

It has been a serious problem how to vary the mode of manufacturing the batch to suit the conditions to which it is subsequently subjected, and in our invention this problem has been solved with perfect results in the following manner: Instead of forcing the dough under pressure through stationary tubes, as in the old way, we have found that by placing the dough in the hopper and then forcing the tubes through the mass to fill them the character of said dough is not changed—*i. e.*, it remains the same or in substantially the same physical condition in the tube that it had while in the hopper, and there is therefore substantially no compacting or hardening of the batch or charge when it is expelled from the tube. Consequently the batch is in the proper condition for the molding-machine and the loaf formed by said machine has the proper physical characteristics for the baking operation.

In view of what has been stated the salient feature of our invention resides in means for so forming a batch of dough that said batch will be left in a condition substantially like that of the mass from which it is taken—*i. e.*, its physical characteristics will be not changed by the operation necessary to produce it, and the batch will be in proper state for the subsequent loaf-forming procedure.

Primarily the object of the invention is the provision of a tube (or a series of tubes) which is forced through a mass of dough while contained in a hopper or other receptacle and removes an increment or increments of said mass, said material being in proper condition for subsequent operations.

A further object of the invention is the provision of improved mechanism for actuating the batch-forming devices and for expelling the batch from the tube.

A further object of the invention is the provision of means for forming dough into batches, each of the desired size and weight, to be submitted to the bread-molding machine.

Other objects of the invention will appear from the detailed description hereinafter given.

In the accompanying drawings.

Like numerals designate similar parts throughout the several views.

Referring to the drawings, the numeral 1 designates the frame of the machine, said frame being of any approved construction.

Figure 2:
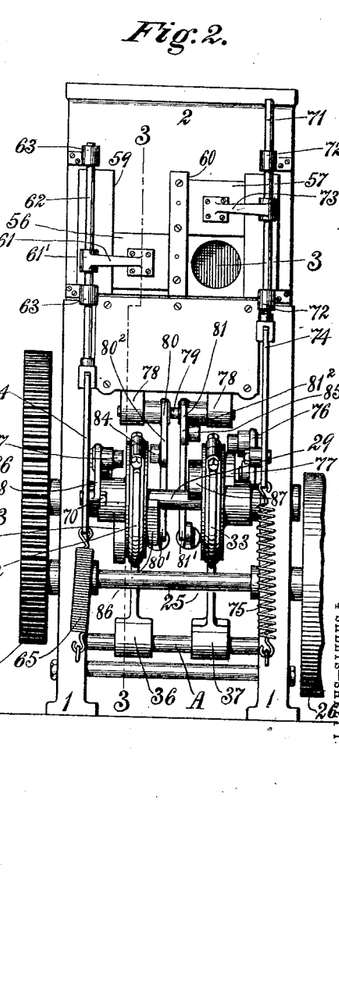
Fig. 2 is an end view of said machine.
Figure 3:
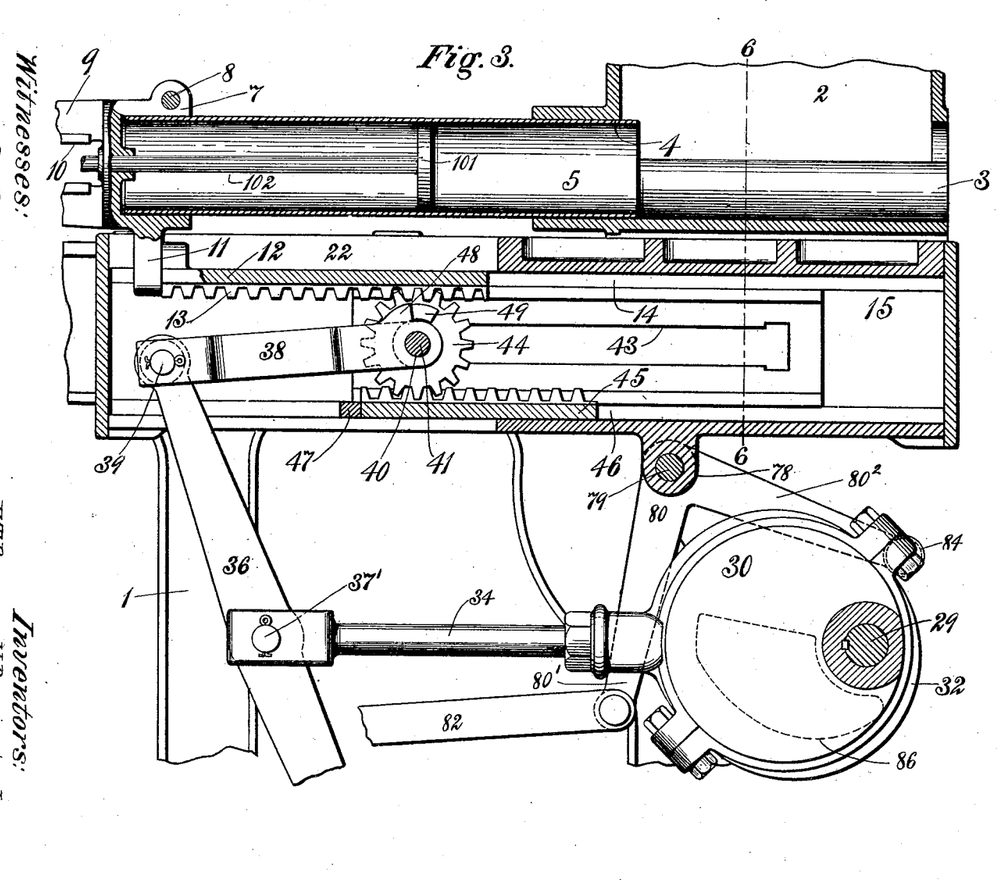
Fig. 3 is a partial longitudinal vertical section on line 3 3 of Fig. 2.
Figures 4, 5, 8:
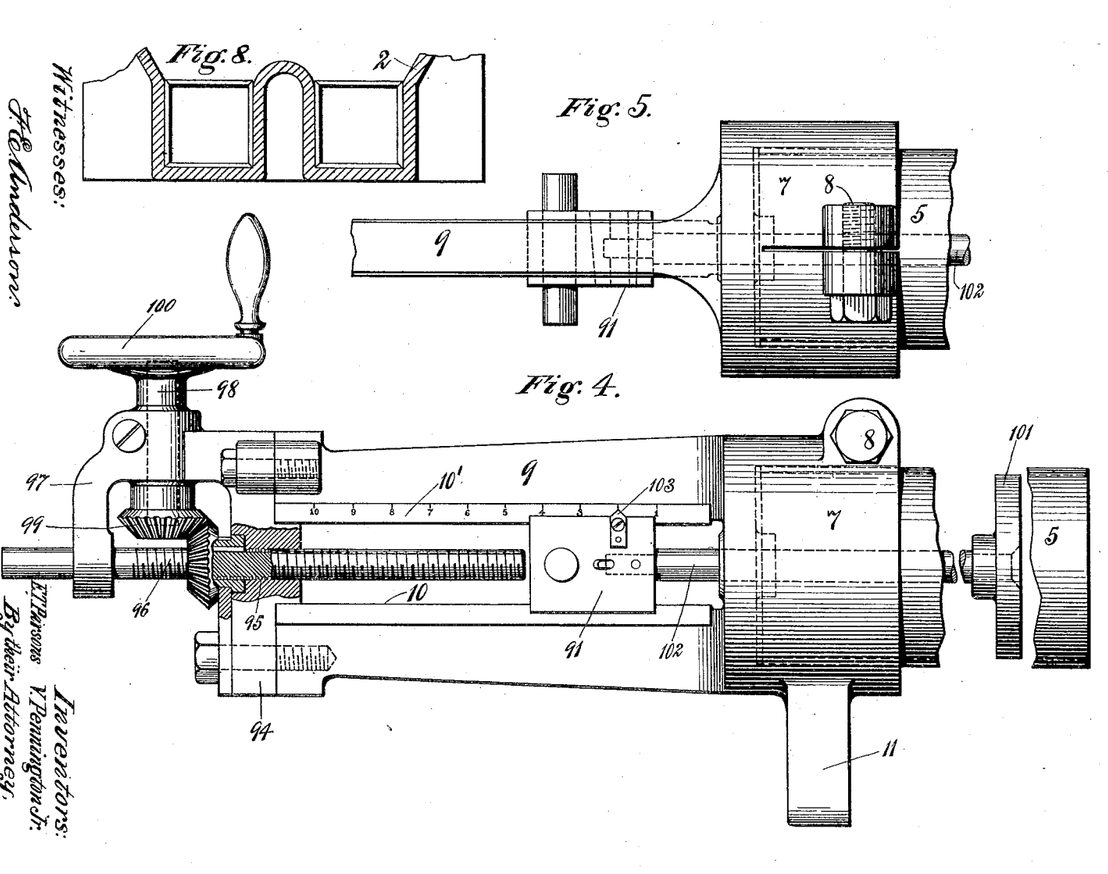
Fig. 4 is a side view, partially in section, of means which may be employed for actuating the plungers or pistons for expelling the dough from the tubes.
Fig. 5 is a plan view of part of the elements represented by Fig. 4.
Fig. 8 is a detail view of tubes of rectangular form, which may be, and preferably are, substituted for the cylindrical tubes of the other figures.
Figure 6:
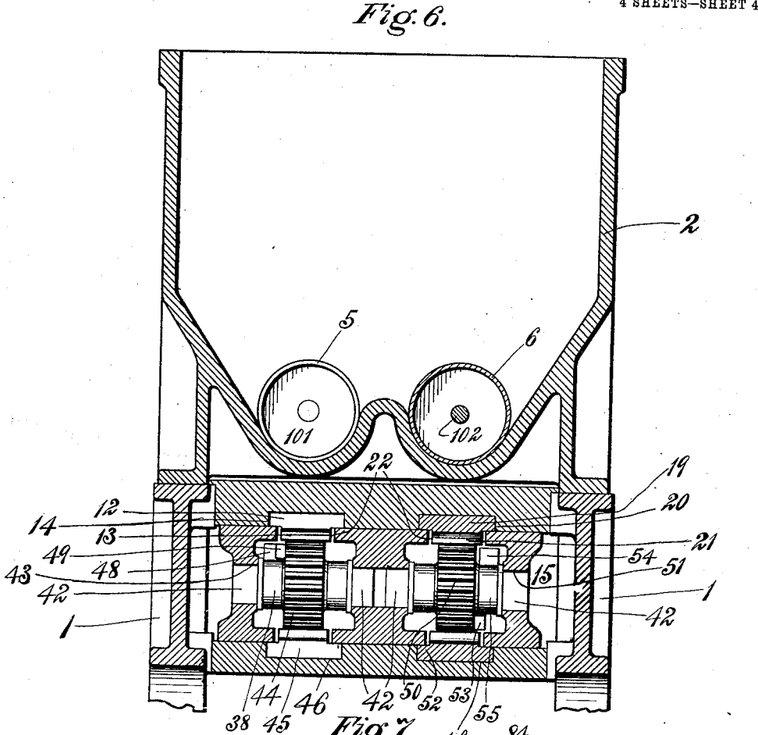
Fig. 6 is a transverse vertical section on line 6 6 of Fig. 3.

Upon the top of this frame is a hopper 2 for the dough, provided with openings 3 and 4 at its front and rear for the reception of tubes 5 and 6, which may be circular, as shown in Figs. 1, 2, 3, and 6, square, as represented in Fig. 8, or of any other desired shape. Tube 5 is secured in a split head 7 by a bolt 8, as represented in Figs. 5 and 6, and this head is at the end of a frame 9, slotted at 10 for a purpose hereinafter stated, one wall of the slot being graduated at 10'. Depending from the head 7 is a lug 11, and attached to said lug is a slide 12, having a rack 13 on its under side, said rack reciprocating in a way 14, formed in the top of a chamber 15 of the frame. Like tube 5, the tube 6 is secured in a split head 16 by a bolt 17, and said head has a depending lug 18, (see Fig. 1,) carrying a slide 19, movable in a way 20 in the top of the frame and provided with a rack 21, as illustrated in Fig. 6. Slots 22 in the top of a chamber 15 of the frame permit the passage of lugs 11 and 18. A frame 23 carries the head 16, and said frame has a slot similar to that in the frame 9 for a purpose hereinafter described. From what has been stated two tubes and two rack-slides for operating said tubes are employed in the machine illustrated, although it is distinctly to be understood that any desired number of said devices may be employed, and in some machines one would prove sufficient without departure from the invention.

In the illustrations given the tubes are alternately actuated—i. e., one tube leaves the hopper while the other is entering the material therein—and any desired means may be employed for reciprocating said tubes or a single tube, the invention not being limited in this respect.

Figure 1:
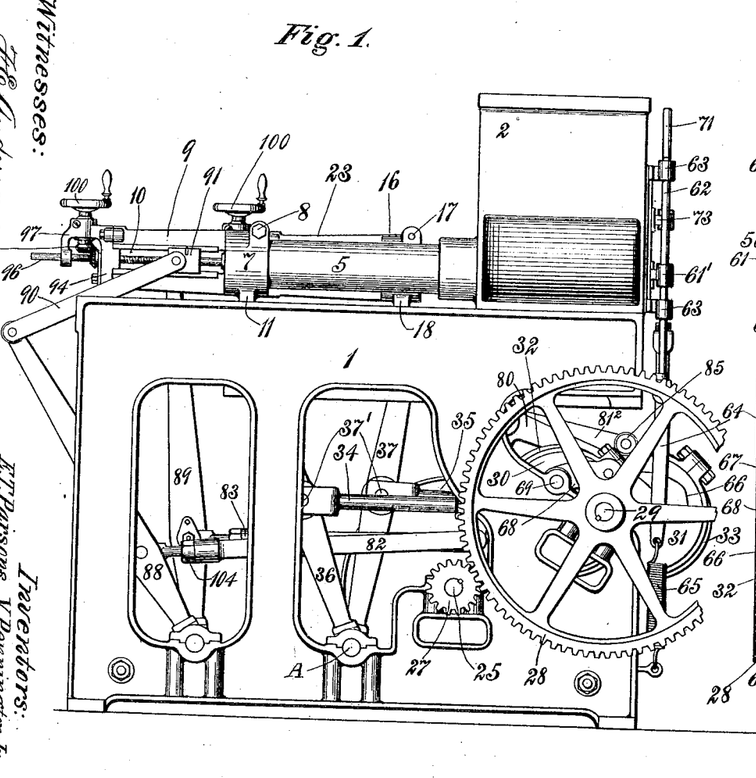
Figure 1 is a side elevation of the improved dough-dividing machine.

In the form of machine illustrated the numeral 25 designates a driving-shaft, carrying a pulley or other power-transmitting instrumentality 26 at one end and a pinion 27 at its opposite extremity. This pinion engages a large gear 28 on a shaft 29, carrying the cam and eccentric mechanism for actuating the tubes and other parts in proper timing, as will now be described. Rigid with said shaft 29 are reversely-set eccentrics 30 31, the straps 32 33 of which are respectively connected to rods 34 35, as illustrated in Figs. 1 and 3.

Designated by A is a shaft extending transversely of the machine, and upon this shaft are sleeved at their lower ends levers 36 and 37, with which the forked extremities of rods 34 and 35 are connected by pins 37'. At its upper end the lever 36 is connected to a link 38 by a pin 39, and the forward end of this link is forked and perforated at 40 to receive a short shaft 41, the ends of which are journaled in blocks 42, which travel in slots 43 of the frame. Between the eyes of fork 40 and secured to the shaft 41 is a pinion 44, in mesh with the rack 13 and with another rack 45, operable in a way 46 of the frame, the inward movement of said rack being limited by a stop 47. Projecting from one ear of the fork 40 is a lug 48, and on the side of the pinion 44 is a coöperating lug 49.

During the forward movement of lever 36 and link 38 the pinion 44 is prevented from rotating by the lugs 48 49, and consequently is locked to the racks 13 45, which are propelled by it, and the tube 5 is forced into the dough of the hopper, receives a charge therefrom, and the stroke of said tube is sufficiently long to bring the end of the tube flush with the outer wall of the opening 3 in the hopper. On the return of the parts just mentioned the pinion 44 is free to rotate, and as more power is required to actuate the slide 12 than the rack 45 the slide 12 will remain stationary until the rack 45, actuated by the pinion during this part of the return movement, engages the stop 47, when the pinion will again be rotated until the stops 48 and 49 engage, and a quick return movement will be given the slide 12 and tube 5 to withdraw the latter from the mass in the hopper to a position in readiness to repeat the operation.

While the tube 5 is retreating the tube 6 is moving forward, and the alternate action is produced by the two sets of racks and pinions shown in Fig. 6. Slide 19 is connected to the tube 6 in the same manner that slide 12 is connected to tube 5. A pinion 50, mounted on a shaft journaled in blocks 42, which travel in slots 51, is in mesh with rack 21 of slide 19, and also engages a shorter rack 52, coöperating with a stop (not shown) like that designated by 47 in Fig. 3, and said pinion carries a lug 53, adapted to engage a complemental lug 54, carried by one of the ears of a fork on the end of a link 55, articulated to lever 37, the latter being driven by the eccentric 31 and rod 35.

It is necessary alternately to open and close the openings 3 and 4 in the front of the hopper 2 to prevent the escape of dough while a tube is entering the same and to permit of the passage of a certain amount from the tube to form a batch, and to accomplish these results, while various devices may be employed, we have illustrated a pair of alternately-operable cut-off slides, which will now be described. These slides are designated by the numerals 56 and 57, are alike in construction and in mode of operation, and reciprocate in guideways 59 and 60, respectively, formed on the front of the hopper.

Attached to the cut-off slide 56 is a bracket 61, having an arm provided with an eye 61', said eye being rigidly secured with capability of adjustment to a rod 62, reciprocable in brackets 63 on the hopper. At its lower end the rod 62 is connected to a link 64, and a spring 65, attached to said link and to the frame, serves constantly to pull the parts downward. To raise the parts just described against the tension of the spring and thus uncover the opening 3 in the hopper, a cam 66 on shaft 29 is provided, and this cam engages a roller 67 on a lever 68, pivoted at 69 to the frame and having a stud 70 at its free end inserted in an opening of the link 64, and thus at the proper time raises said slide 56, which after the cam passes is forced downward by spring 65 to close the opening. Slide 57 is in like manner secured to a rod 71, movable in brackets 72 on the hopper, and connected to said slide by a bracket 73. A link 74 is attached to the lower end of the rod 71, and a spring 75 connects said link with the frame. A pivoted lever 76, operated by a cam 77 in precisely the same manner as lever 68, serves to raise the slide 57 against the stress of spring 75 to permit the escape of the dough through the opening 4 of the hopper. As will be seen from Fig. 2, the slides are alternately operated, and when one is up the other is down to cover a discharge-opening and afford a backing for the dough as the tube enters the same. To enable precisionized weight and dimensions of the batch severed in each tube to be secured, means are provided for ejecting the exact amount of dough required for any desired weight of loaf from each tube 5 or 6 or for varying the quantity expelled from said tubes, as desired, so that the batch from one tube may vary from that of the other tube.

Figure 7:
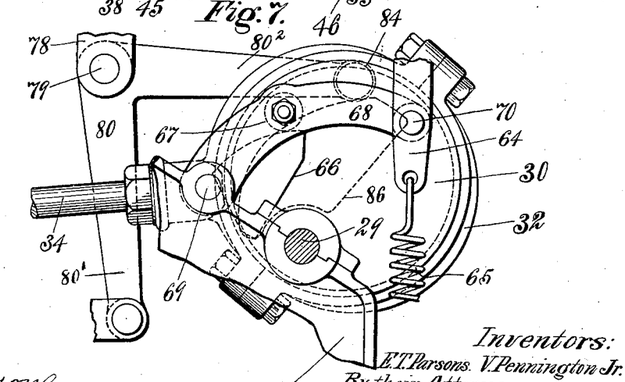
Fig. 7 is a detail view of the eccentric and lever mechanism employed in actuating the plunger-operating devices.

In hangers 78 depending from the frame a shaft 79 is fixed, and on this shaft are sleeved a pair of angle-levers 80 81, as shown in Fig. 2 and Fig. 7. Each arm 80' 81', respectively, of these angle-levers is articulated to a pitman or connecting-rod 82 83, respectively, while the free arms 80² 81² of said levers are equipped with studs or rollers 84 85, actuated by cams carried by the shaft 29. These cams are illustrated in Fig. 2, and one of them, 86, positively actuates the angle-lever 80, while the other, 87, operates the angle-lever 81. Designated by 88 is a pivoted lever to which the end of rod 82 is connected, and by 89 is a like lever to which the rod 83 is attached.

A link 90 connects lever 88 with a slide 91, movable in a slot of frame 9, and a similar link 92 connects the lever 89 with the other slide 93. (Not shown.) In a cross-head 94, closing the end of each slotted frame 9 and 23, is a nut 95, and engaging said nut is a screw 96. An overhanging bracket 97, projecting from the cross-head, affords bearings for the end of the screw and for a shaft 98, carrying a bevel-pinion 99 and a hand-wheel 100. As both slotted frames carrying the split heads in which the tubes 5 and 6 are clamped are alike in construction, the feed adjusting and ejecting devices carried by each will be designated by the same numerals. In each tube 5 is mounted an ejecting plunger or piston 101, the rod 102 of which is keyed to the slide 91. As before described, a series of graduations 10', indicating the quantity of a charge to be ejected to form a batch of desired weight, is formed on one of the side walls of frame 9 and carried by the slide 91, and coöperating with these graduations is a pointer 103, which will indicate the weight of the charge expelled from the tube by the plunger. Thus if it should be desired to expel material sufficient for a pound-loaf from the tube, the slide would be moved until the pointer would be opposite the mark "1" of the graduations, and the hand-wheel 100 would then be turned to adjust the screw until its end was substantially in contact with the slide, thus setting the plunger in its tube at the desired distance from the end thereof to permit only the required amount of dough to enter said tube as the latter advances into the hopper, as shown in Fig. 3. To enable the adjustment to be made, either interchangeable links 90 of various lengths may be employed to unite the slides 91 93 and levers 88 89, or an adjustable connection of common form, such as shown at 104, may be used to lengthen and shorten the rods 82 83 for operating either lever 88 or 89. In the operation of this form of our invention dough is placed in the hopper 2 and the machine is set in motion, and as both tubes 5 and 6 alternately operate in the same way the description of one will suffice for both.

In Fig. 1 the tube 5 is shown in substantially its full rearward position, and the plunger 101 has been adjusted by slide 93 to bring the pointer 103 to the second indicating-mark of the frame 9. With these conditions existing the eccentric 30 actuates, through rod 34, the lever 36, which is connected by link 38 with the axle of the pinion 44, and the lugs 48 and 49 of the link and pinion being in engagement said pinion is locked against rotation and serves to advance the racks 13 45 in their ways of the machine-frame. As the slide 12 moves it carries with it the frame 9 and its various parts and causes the tube 5 to enter the dough in the hopper and to receive a charge therefrom, the weight of said charge being determined by the position of the piston or plunger 101 in the tube. During the period of advancing movement of the tube the sliding cut-off or gate 56 is held down by the spring 65, and in the timing of the machine just at the termination of said advancing movement said cut-off is raised by the cam 66 and lever 68 to uncover the opening 3 in the wall of the hopper and to permit the dough in the tube to be advanced through said opening by the expelling-plunger 101, which, as before stated, is actuated by the lever and link and cam mechanism described. When the dough passes through said opening, the cam 66 passes off from the stud 67 of lever 62, and the slide 56 is immediately lowered by spring 65 to close the opening, and the batch then falls upon the usual conveyer to be carried to the molding-machine. During the return movement of the reciprocator and rotary pinion 44, as it requires more force to move the slide 12 and the parts connected thereto than it does to actuate the slide 45, the teeth 13 of said slide 12 act temporarily as a stationary rack, and the rack 45 is withdrawn until it engages the cross-strip 47, when these conditions are reversed and the pinion 44 is then rotated in the opposite direction and serves rapidly to withdraw with multiplied speed the slide 12, tube 5, and other parts connected to said slide. In operating the tube 6 the same conditions prevail, and as one tube is withdrawn while the other is being advanced an alternate movement is the result, which is advantageous in practice. It is, however, distinctly to be understood that by suitable modifications in the actuating mechanism the tubes could, if desired, be simultaneously advanced and withdrawn without departure from the invention.

Modifications may be made in the form and proportions of the parts, and the machine may be arranged either horizontally, as shown, vertically, or otherwise without departure from the invention. So, too, various cut-offs may be employed and any suitable mechanism may be substituted for that shown for actuating the various parts without departure from the invention.

While our machine is described as employed for the treatment of dough, it is distinctly to be understood that it is not limited to any particular use nor to any specific art, for it may be employed for dividing plastic materials other than dough and also for separating measured charges of granular and pulverulent materials from a mass thereof in a hopper, if desired.

Having thus described our invention, what we claim is—

1. In a machine for dividing charges from a mass of material, the combination, with a hopper having an opening in its wall, of an open-ended tube entering said hopper; means for forcing said tube into the material in the hopper to cause it to remove an increment of the mass therein; means for ejecting a charge from the tube through the opening in the wall of the hopper; and means for withdrawing the tube.

2. The combination, with a hopper having alined openings in its front and rear walls, of a tube open at its end; means for forcing said tube into material contained in the hopper, to cause an increment of the mass in the hopper to enter said tube; and means for expelling a charge from the tube.

3. The combination, with a hopper, of a series of alternately-operable tubes for removing charges of material therefrom; and means for ejecting the charges from said tubes.

4. The combination, with a hopper, of a series of alternately-operable tubes for removing material therefrom; and a series of alternately-operable plungers for ejecting the charges from the tubes.

5. The combination, with a hopper having alined openings, of a tube open at its end for removing a charge of material from said hopper; a gate for closing the discharge-opening in the hopper when the tube is advancing; means for actuating said gate to cover and uncover said opening; and means for ejecting the charge from the tube.

6. The combination, with a hopper having a series of openings, of tubes reciprocable in the hopper; gates; means for actuating said gates to cause them to cover and uncover the openings; and means for ejecting charges of material from the tubes.

7. The combination, with a hopper having alined openings, of a tube open at its end for removing a charge of material from the hopper; an ejector in said tube; a gate; and means for operating said gate, to cause it to cover and uncover one of the openings in said hopper.

8. The combination, with a hopper having alined openings in its front and rear walls, of tubes operable in a pair of said openings; ejectors in the tubes; means for actuating said ejectors; gates movable to close the other openings of the hopper; and means for actuating said gates.

9. The combination, with a hopper having alined openings, of tubes operable in said openings; means for alternately operating the tubes; ejectors in said tubes; means for alternately operating the ejectors; and alternately-operable gates for covering and uncovering a series of the openings.

10. The combination, with a frame, of a tube secured thereto; means for reciprocating the frame; a piston within the tube; means for setting said piston; means for reciprocating the piston; a hopper through which the tube passes; and a gate for controlling the passage of the charge from the tube.

11. The combination, with a hopper, of a device for removing material therefrom; a rack for reciprocating said device, a reciprocatory and rotary pinion in mesh with said rack; a sliding rack with which the teeth of the pinion also engage; and a stop for limiting the movement of said sliding rack.

12. The combination, with a hopper, of a device for removing material therefrom; a rack for reciprocating said device; a pinion having a stop; a carrier for the pinion having a stop; means for reciprocating said carrier; a sliding rack with which the pinion engages; and a stop for limiting the movement of said sliding rack.

13. The combination, with a hopper, of a device for removing material therefrom; a rack connected to said device; a pinion in mesh with the rack, and having a stop; a link in which the pinion is journaled, said link having a stop coöperating with the pinion-stop; means for actuating the link; a sliding rack with which the pinion is in mesh; and a stop for limiting the movement of said sliding rack.

14. The combination, with a hopper, of tubes; means for alternately advancing said tubes; means for alternately ejecting the charges from the tubes; and means for alternately withdrawing the tubes at accelerated speed.

15. The combination, with a hopper, and with means for ejecting a charge through an opening thereof, of a cut-off; a spring for actuating said cut-off in one direction; and cam-controlled devices for actuating the cut-off in the opposite direction.

16. The combination, with a hopper having a discharge-opening, of a gate for covering and uncovering said opening; a rod for actuating said gate; a link connected to the rod; a lever for actuating the link in one direction; a cam for operating the lever; and a spring for actuating the link in an opposite direction.

17. The combination, with a hopper having discharge-openings, and with means for ejecting material through said openings, of cut-offs for covering and uncovering the openings; rods to which the cut-offs are attached; links connected to the rods; cam-and-lever mechanism for actuating the links in one direction; and springs for actuating the links in an opposite direction.

18. The combination, with a hopper, of a tube; means for actuating the tube to cause it to enter the mass in the hopper, and receive a charge therefrom; an ejecting device in the tube; a slide to which said ejecting device is connected; an adjustable stop for limiting the movement of the slide; and means for actuating said stop.

19. The combination, with a hopper, of a tube; means for actuating the tube to cause it to enter the mass in the hopper, and receive a charge therefrom; an ejecting device in the tube; a slide to which said ejecting device is connected; a screw for limiting the movement of said slide; and means for actuating said screw.

20. The combination, with a hopper, of a tube; means for actuating the tube to cause it to enter the mass in the hopper, and receive a charge therefrom; an ejecting device in the tube; a slide to which said ejecting device is connected; a screw for limiting the movement of said slide; a nut in which the screw works; and gearing for rotating the screw.

21. The combination, with a slotted carrier, and with a tube secured thereto, of a hopper having an opening through which the tube passes; means for reciprocating the carrier; a slide mounted in the slot of the carrier; an ejector operated by the slide; means for reciprocating said slide; and an adjustable stop for limiting the return movement of the slide.

22. The combination, with a slotted carrier, and with a tube projecting therefrom, of a hopper having an opening through which the tube passes; means for reciprocating the carrier; an ejector in the tube; a slide for operating said ejector; a pointer carried by the slide, and coöperating with indicating-marks of the carrier; and an adjustable stop for limiting the movement of the slide.

23. The combination, with a slotted carrier and with a tube projecting therefrom, of a hopper having an opening through which the tube passes; an ejecting-piston mounted in the tube; a slide fitted in the slot of the carrier, and to which the rod of the piston is secured; a screw working in a nut in the carrier, and serving to limit the movement of said slide; and gearing for rotating the screw.

24. The combination, with a slotted carrier, and with means for reciprocating said carrier, of a tube projecting from the carrier; a hopper having an opening through which the tube passes; an ejecting-piston in the tube; a device for reciprocating said piston; a screw mounted in a nut in the carrier, and serving to limit the return movement of the slide; and gearing for rotating said screw.

25. The combination, with a hopper, of a tube open at its end for removing a charge of material therefrom; a carrier for said tube; differential-speed mechanism for actuating the carrier; a shaft; and devices operated by said shaft for actuating the differential-speed mechanism.

26. The combination, with a hopper, of a carrier; a tube rigid with the carrier, and adapted to enter the material therein; and remove a charge of such material; an ejector in the tube; a shaft; mechanism actuated by the shaft for operating the carrier; and devices also actuated by the shaft for operating the ejector.

27. The combination, with a hopper having a discharge-opening, of a carrier; a tube rigid with the carrier; means for ejecting a charge of material from the tube; differential-speed mechanism for actuating said means; a gate located adjacent to said discharge-opening; means for operating said gate; a shaft; and means operated by the shaft for actuating the differential-speed mechanism.

28. The combination, with a hopper, of a tube reciprocable in an opening therein; a slotted carrier for the tube; an ejector in the tube; a slide fitted in the slot of the carrier, and carrying the ejector; a screw threaded into the carrier, and serving to limit the stroke of the slide; a link connected to the slide; a pivoted lever articulated to the link; and means for actuating said pivoted lever.

29. The combination, with a movable tube, and with an ejector therein, of a slide carrying said ejector; a link connected to the slide; a pivoted lever articulated to the link; a rod connected to the lever; an angle-lever, one arm of which is articulated to the rod; and a cam operable upon the other arm of said angle-lever.

30. The combination, with a tube, of a carrier for said tube; a rack rigid with the carrier; a pinion in mesh with the rack; a second rack with which the pinion engages; a link carrying the pinion; means for limiting the rotation of said pinion; a lever connected to the link; a shaft; and means actuated by said shaft for operating the lever.

31. The combination, with a tube, of a carrier for said tube; a rack rigid with the carrier; a pinion in mesh with the rack; a second rack with which the pinion engages; a link carrying the pinion; means for limiting the rotation of said pinion; a lever connected to the link; a shaft; and an eccentric carried by the shaft, and the strap of which is connected with said lever.

32. The combination, with a hopper, of means for removing a charge of material therefrom; multiple rack-and-pinion mechanism for actuating said means; a shaft; and means operated by the shaft for actuating said rack-and-pinion mechanism.

33. The combination, with a carrier having a head, of a tube secured to said head; a hopper which the tube enters; means for actuating the carrier; a slide on the carrier; an ejector, the rod of which is secured to the slide; means for reciprocating the carrier; means for independently reciprocating the slide; a gate coöperating with a discharge-opening of the hopper; and means for actuating said gate.

34. The combination, with a hopper for containing dough, said hopper having discharge-openings, of a series of tubes entering said hopper, and each receiving a charge from the material therein; an ejector in each tube; means for actuating the ejectors; means for reciprocating the tubes; means for opening and closing the discharge-openings of the hopper; and devices for actuating said means.

35. The combination, with a shaft having reversely-set eccentrics, of a hopper; tubes entering the hopper, and each receiving a charge therefrom; means operated by the eccentrics for actuating the tubes; ejectors in the tubes; and means for actuating said ejectors.

36. The combination, with a shaft having eccentrics, of carriers; mechanism actuated by said eccentrics for operating the carriers; tubes held by said carriers; a hopper having openings through which the tubes pass, and also having discharge-openings, ejectors in the tubes; means for operating said ejectors; and means for covering and uncovering said discharge-openings.

37. The combination, with a shaft, of a series of tubes; means actuated by the shaft for reciprocating the tubes; a hopper having a series of alined openings, certain of which are discharge-openings; gates for opening and closing the discharge-openings; ejectors in the tubes; means actuated by the shaft for operating the ejectors; and means also operated by the shaft for operating the gates.

38. The combination, with a hopper, having an opening in its rear wall, and an opening in its front wall, of a slotted frame; a tube; a carrier for the tube; a rack connected to the carrier; a pinion in engagement with said rack, and having a stop-lug, the ends of the pinion-axle moving in the slots of the frame; a device sleeved upon the axle of the pinion, and having a stop-lug coöperating with that of the pinion; means for actuating said device; a loose rack with which the pinion also engages; means for limiting the movement of said rack; an ejector in the tube; and means for actuating said ejector.

39. The combination, with a slotted frame having a head, said frame being provided with graduations along a wall of its slot, of a tube rigid with the head; means for reciprocating the slotted frame; a piston in the tube; a slide movable in the slot of said frame; an adjustable stop for the slide; a pointer carried by the slide; a hopper having alined openings; and means for covering and uncovering one of said openings.

40. The combination, with a hopper, and with a slotted frame for supporting said hopper, of pinions, the axles of which are located in the frame-slots; stops on the pinions; links sleeved on the axles of said pinions; stops on the ends of the links; pairs of racks with which the pinions engage; stops for one pair of the racks; tubes actuated by the other pair of racks; and means for actuating the links.

41. In a dough-dividing machine, the combination of the following instrumentalities— a receptacle for the dough having openings in its front and rear wall; a closure for the opening in the front wall; a tube movable in the opening of the front wall; an ejector in the tube; means for reciprocating the tube at one speed while advancing, and at a different speed while returning; means for reciprocating the ejector; and means for actuating the closure to cause it to uncover said opening in the front wall immediately preceding the forward movement of the ejector.

42. In a dough-dividing machine, the combination, with a hopper having openings, of a tube; means for advancing the tube through the hopper, and for temporarily retaining it in advanced position; a closure for the discharge-opening of the hopper; means for retaining said closure in place during the advancing movement of the tube, and for shifting it at the termination of said movement; an ejector for expelling the charge from the tube; and means for withdrawing the tube.

In testimony whereof we affix our signatures in presence of two witnesses.

EDWARD T. PARSONS.
VIRGIL PENNINGTON, Jr.

Witnesses:
CHAS. A. THOMSON,
ALBERT E. SCOTT.